(12) United States Patent
Stone

(10) Patent No.: US 11,957,106 B2
(45) Date of Patent: Apr. 16, 2024

(54) PET TOY WITH TREAT DISPENSING GYRO DEVICE

(71) Applicant: The KONG Company, LLC, Golden, CO (US)

(72) Inventor: John James Stone, Golden, CO (US)

(73) Assignee: THE KONG COMPANY, LLC, Golden, CO (US)

( * ) Notice: Subject to any disclaimer, the term of this patent is extended or adjusted under 35 U.S.C. 154(b) by 620 days.

(21) Appl. No.: 15/135,271

(22) Filed: Apr. 21, 2016

(65) Prior Publication Data
US 2017/0303509 A1  Oct. 26, 2017

(51) Int. Cl.
*A01K 15/02* (2006.01)
*A01K 5/00* (2006.01)

(52) U.S. Cl.
CPC ........... *A01K 15/026* (2013.01); *A01K 5/00* (2013.01); *A01K 15/025* (2013.01)

(58) Field of Classification Search
CPC ...... A01K 15/025; A01K 15/026; A01K 5/00; A01K 15/024; A63H 33/18; A63H 33/02; A63H 33/007
USPC .......................... D21/455; 119/707, 709, 702
See application file for complete search history.

(56) References Cited

U.S. PATENT DOCUMENTS

| | | | | |
|---|---|---|---|---|
| 1,849,414 A * | 3/1932 | Turnbull | ................. | A63B 37/10 473/588 |
| 4,793,769 A * | 12/1988 | Dolan | ..................... | A63B 67/14 473/588 |
| 5,045,011 A * | 9/1991 | Lovik | ..................... | A63H 33/18 446/46 |
| 5,072,843 A * | 12/1991 | James | ................... | A61J 9/0607 215/11.1 |
| 5,360,363 A * | 11/1994 | Levin | ..................... | A63H 33/18 446/236 |
| 5,531,442 A * | 7/1996 | Gill | ........................ | A63B 67/14 446/121 |
| 5,733,213 A * | 3/1998 | Colarusso | .............. | A63B 67/14 473/588 |
| 5,809,938 A * | 9/1998 | Baiera | .................. | A01K 15/025 119/707 |
| 6,073,581 A | 6/2000 | Wang | | |
| 6,405,682 B1 * | 6/2002 | Simon | .................. | A01K 15/025 119/707 |

(Continued)

OTHER PUBLICATIONS

U.S. Appl. No. 29/562,013, filed Apr. 21, 2016, Stone et al.

*Primary Examiner* — Jeffrey R Larsen
(74) *Attorney, Agent, or Firm* — Berg Hill Greenleaf Ruscitti LLP

(57) ABSTRACT

A pet toy includes a ring shaped peripheral body and an interior dispenser. An interior curved engaging surface of the peripheral body engages an exterior spherical surface of the dispenser. A curvature of the interior engaging surface allows the dispenser to continuously roll or rotate, yet maintain engagement with the peripheral body when the peripheral body is displaced by contact. The dispenser is hollow thereby defining a chamber to receive treats. One or more dispensing openings are provided on the dispenser to selectively dispense treats. The openings can be sized to selectively dispense treats of various sizes and shapes. The invention further includes a method of dispensing treats from a pet toy and a combination comprising the pet toy and selected treats loaded within the chamber.

19 Claims, 3 Drawing Sheets

(56) References Cited

U.S. PATENT DOCUMENTS

| | | | | |
|---|---|---|---|---|
| 6,557,496 B2 | 5/2003 | Harrenbruck | | |
| 7,600,488 B2 | 10/2009 | Mann | | |
| 8,904,967 B2 | 12/2014 | Reiss et al. | | |
| 2005/0045115 A1* | 3/2005 | Mann | ............... | A01K 15/026 |
| | | | | 119/711 |
| 2006/0054106 A1* | 3/2006 | Renforth | ............... | A01K 15/025 |
| | | | | 119/711 |
| 2009/0255482 A1* | 10/2009 | Santarsiero | ............... | A01K 15/025 |
| | | | | 119/707 |
| 2011/0148062 A1* | 6/2011 | Reyes, Jr. | ............... | F16C 19/22 |
| | | | | 384/440 |
| 2011/0186645 A1* | 8/2011 | Mielke | ............... | A63H 18/10 |
| | | | | 238/10 A |
| 2012/0318210 A1* | 12/2012 | Anderson | ............... | A01K 5/0114 |
| | | | | 119/710 |
| 2013/0247836 A1* | 9/2013 | Axelrod | ............... | A01K 15/026 |
| | | | | 119/709 |
| 2014/0270931 A1* | 9/2014 | Jager | ............... | A01K 15/025 |
| | | | | 403/343 |

* cited by examiner

PET TOY WITH TREAT DISPENSING GYRO DEVICE

The invention relates to a pet toy for dispensing treats, and more particularly, to a pet toy having a rolling dispensing element that is engaged with a peripheral body that remains substantially stationary while the dispensing element rotates to dispense treats.

BACKGROUND OF THE INVENTION

Due to the increased commercialization of pet products and particularly pet toys, there are now a wide range of pet toys available with many distinct functional features. Pet toys can be made from many different types of materials along with a nearly limitless number of shapes and colors.

One general category of pet toys is those made of a flexible or elastomeric material, such as rubber. These toys, if made from quality materials, can withstand the biting action of an animal, and can keep an animal occupied for extended periods of time. It is known to place treats in these types of toys to increase the interaction of the animal with the toy. A sound emitting device, often referred to as a "squeaker", is also known to be placed inside the toy to further stimulate the animal.

Another general category of pet toys are those which may generally be referred to as "plush" toys. These types of toys are made from different types of cloth or fabric, and may also include material woven into strands, such as nylon rope. The plush toy is typically stuffed with a fibrous material, such as polyester stuffing, to provide the toy with an increased thickness or bulk that enables the animal to chew on the toy. Plush toys may also include squeakers to further stimulate the animal.

Yet another general category of pet toys are those that are especially adapted for dispensing treats. This category is typically incorporated within a pet toy that has a chamber to receive the treats and one or more openings that enable the treats to be dispensed by movement of the toy.

One example of a treat dispensing pet toy includes the invention disclosed in the U.S. Pat. No. 8,904,967. The treat dispenser dispenses treats by moving the dispenser in a way to gravity release treats from the interior hollow chamber of the toy. The dispenser includes a central spherical body, and a plurality of peripherally spaced spheres or balls connected to the body by respective branches. Each of the balls has a treat dispensing opening. The body has an opening for charging or loading treats. As an animal plays with the device, treats are dispensed through the openings. The openings are located at different positions on each of the balls so that treats are likely to be dispensed when the device is placed at various orientations.

Another example of a treat dispensing toy is disclosed in the U.S. Pat. No. 6,073,581. A ball-like toy includes a spherical shell and a cylindrical valve, the spherical shell being formed of two symmetrical half shells. The half shells have ribs and partition boards, the cylindrical valve being mounted in a hole on the spherical shell and retained between the ribs and partition boards of the half shells. When the toy is rotated within a limited angle, dog food is discharged out of the spherical shell through the cylindrical valve when the spherical shell is rolled on the ground.

Yet another example of a treat dispensing toy is disclosed in the U.S. Pat. No. 7,600,488. This reference provides a pet with a body having a first treat-retaining cavity and a first opening that extends between the first treat-retaining cavity and an outer surface of the body. A metering device in the first opening dispenses treats from the first treat-retaining cavity through the first opening at a metered rate. The first treat-retaining cavity is refillable through the metering device.

Considering the common forms of construction for many types of pet toys, there is still a need to provide a pet toy that can dispense treats in a manner that will provide greater interest to an animal for extended play and interaction with the toy. There is also a need to provide a pet toy that is robust enough to withstand contact by the animal and owner, but is relatively simple in construction and therefore can be produced at a reasonable cost.

The invention described below provides solutions to many limitations in the prior art and incorporates a unique construction which is capable of continuously dispensing treats in a reliable manner. The invention also provides a pet toy that is relatively simple in structure, but provides multiple distinct features which may enhance an animal's interaction with the pet toy.

SUMMARY OF THE INVENTION

According to a preferred embodiment of the invention, it includes a pet toy having a peripheral body or peripheral ring and a central or interior rolling dispenser engaged with the peripheral body. The peripheral body has a ring shape with an interior curved engaging surface which engages an exterior spherical surface of the rolling dispenser. The curvature of the interior engaging surface allows the rolling dispenser to continuously roll or rotate, yet maintain engagement with the peripheral body. When placed on a flat surface, the peripheral body remains substantially parallel with the flat surface and thereby provides additional stability to the dispenser so that the dispenser may continuously roll when the pet toy is moved by contact with the peripheral body.

The dispenser is hollow thereby defining a chamber to receive treats. One or more dispensing openings are provided on the dispenser to selectively dispense treats. The one or more openings can be sized to selectively dispense treats of various sizes and shapes.

The dispenser may be configured in two pieces that are engaged by threads. In order to load the dispenser, the pieces are unscrewed, treats are placed in the chamber of the dispenser, and then the pieces are screwed together. Additionally or alternatively, treats may be loaded in the dispenser through the one or more dispensing openings.

The combination of the rolling dispenser and the attached peripheral body provides many advantages for entertaining an animal as well as providing a reliable device for selectively dispensing treats. The peripheral body provides additional structure for a pet owner or an animal to grab or hold the device so that the rolling dispenser can be selectively controlled to dispense treats. For example, the one or more dispensing openings can be positioned so that gravity along with the rolling or spinning action of the rolling dispenser results in release of treats from within the dispenser.

Additionally, as the dispenser rolls, the location of the one or more dispensing openings changes with respect to the peripheral body. In some positions as the dispenser rolls, the one or more dispensing openings may be fully or partially obstructed by the interior curved engaging surface of the peripheral body to slow or to prevent treats from being dispensed. In other positions, none of the openings are obstructed which may therefore allow an increased rate of treat dispensing. Additionally, random movement of the peripheral body also provides some unpredictable or randomness in dispensing of treats, which may be more characteristic of how and animal interacts with the device. Generally however, the more intense rolling of the dispenser will result in greater amounts of treats being dispensed and therefore, the more vigorously and animal interacts with the pet toy, the greater reward potentially for receiving treats. Accordingly, and animal may learn to more vigorously play with the device to receive a greater number of treats.

The combination of the peripheral body and interior rolling dispenser visually resembles a gyroscope in which the interior rolling dispenser is similar to the rotor of a gyroscope. The peripheral body is similar to the gimbal of the gyroscope. However, functionally, one significant distinction is that the interior rolling dispenser rolls by frictional contact against a solid surface, namely, the ground while the peripheral body is maintained in a substantially fixed orientation with respect to the ground as the interior rolling dispenser rotates. In this regard, another conceptual way to view the pet toy of the invention is that, while the interior rolling dispenser and peripheral body look similar to a gyroscope, the manner in which the pet toy operates is reversed in that the interior rolling dispenser freely rotates while the peripheral body remains substantially stationary and thereby unaffected by the rotation of the interior rolling dispenser. In other words, while the peripheral body moves linearly after being contacted when the pet toy is lying on a surface such as the ground, the peripheral body remains substantially stationary in the sense that it does not rotate with the interior rolling dispenser.

Additional features and advantages of the invention will become apparent by review the following detailed description, taken in conjunction with the drawings.

DETAILED DESCRIPTION

Figure 1:
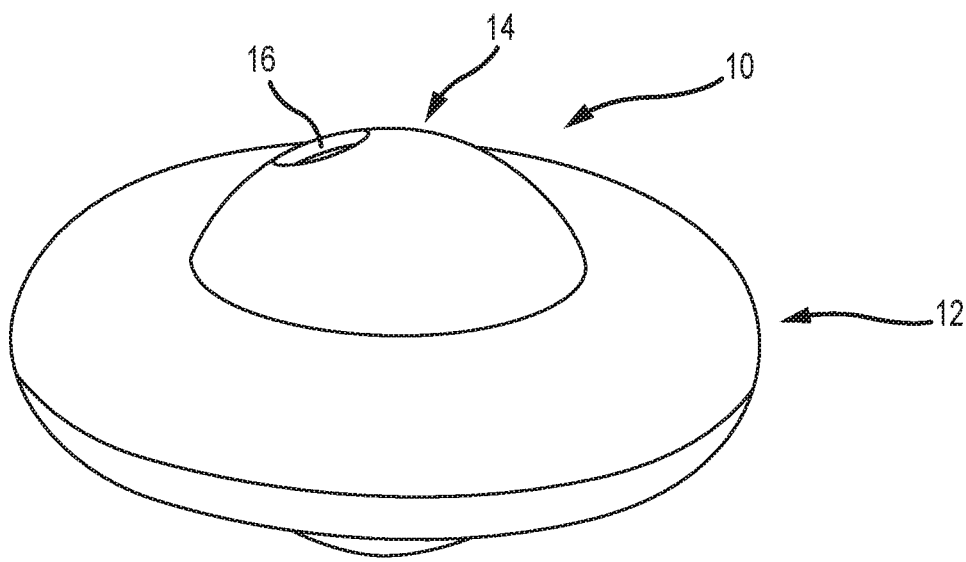
FIG. 1 is a perspective view of the pet toy of the invention.
Figure 2:
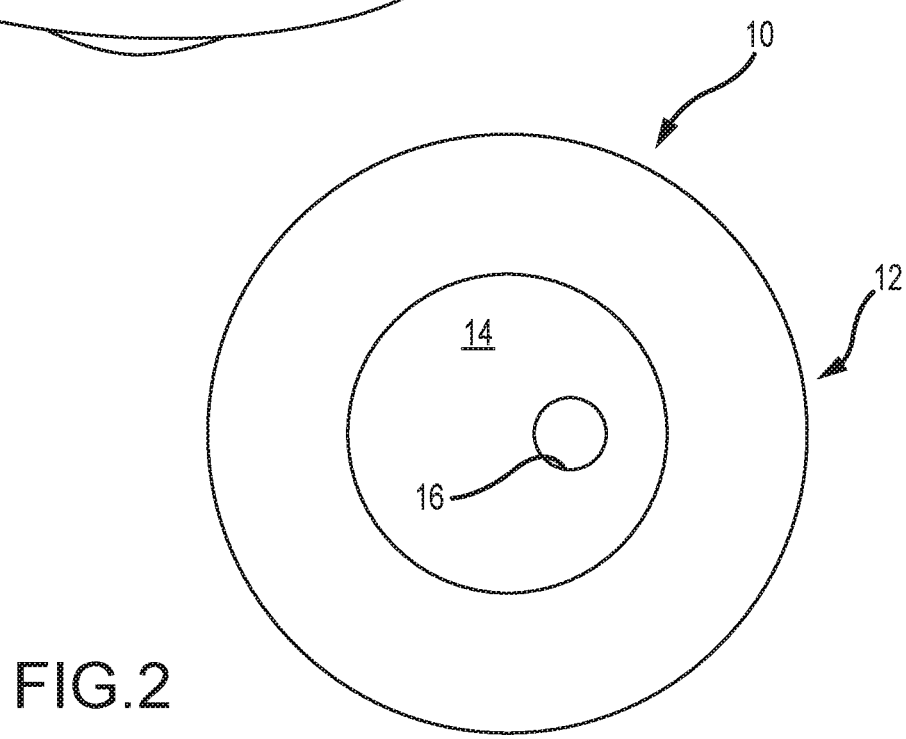
FIG. 2 is a top plan view of the invention.
Figure 3:
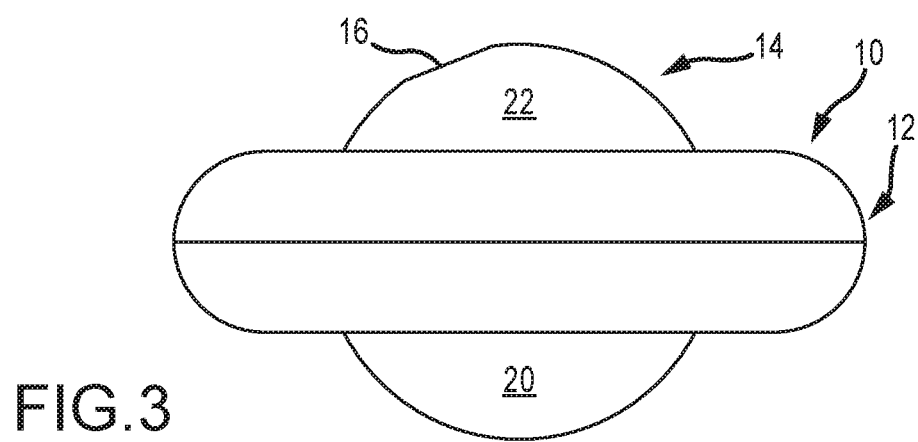
FIG. 3 is a front elevation view of the invention.

Referring to FIGS. 1-3, the pet toy 10 of the invention is illustrated in a preferred embodiment. The pet toy comprises two major elements, namely, a peripheral body or ring 12 and a central or interior rolling dispenser 14. The peripheral body 12 is generally torus shaped and includes a central opening 18 to receive the dispenser 14. The dispenser 14 is substantially round or spherical shaped and has an interior chamber 28 (illustrated in FIG. 5). A dispensing opening 16 allows treats loaded within the interior chamber 28 of the dispenser 14 to be selectively dispensed as the dispenser 14 rotates. The dispenser 14 is peripherally surrounded by, and engaged with, an interior engaging surface 42 (shown in FIG. 5) of the peripheral body 12. Said another way, the dispenser 14 is retained within the central opening 18 of the peripheral body 12. However, the dispenser 14 is capable of freely rotating with respect to the peripheral body 12. Minimal force is required for the dispenser 14 to rotate relative to the peripheral body 12 as a very small gap or space exists between the spherical exterior surface 40 of the dispenser 14 and the interior engaging surface 42 of the peripheral body 12.

Figure 4:
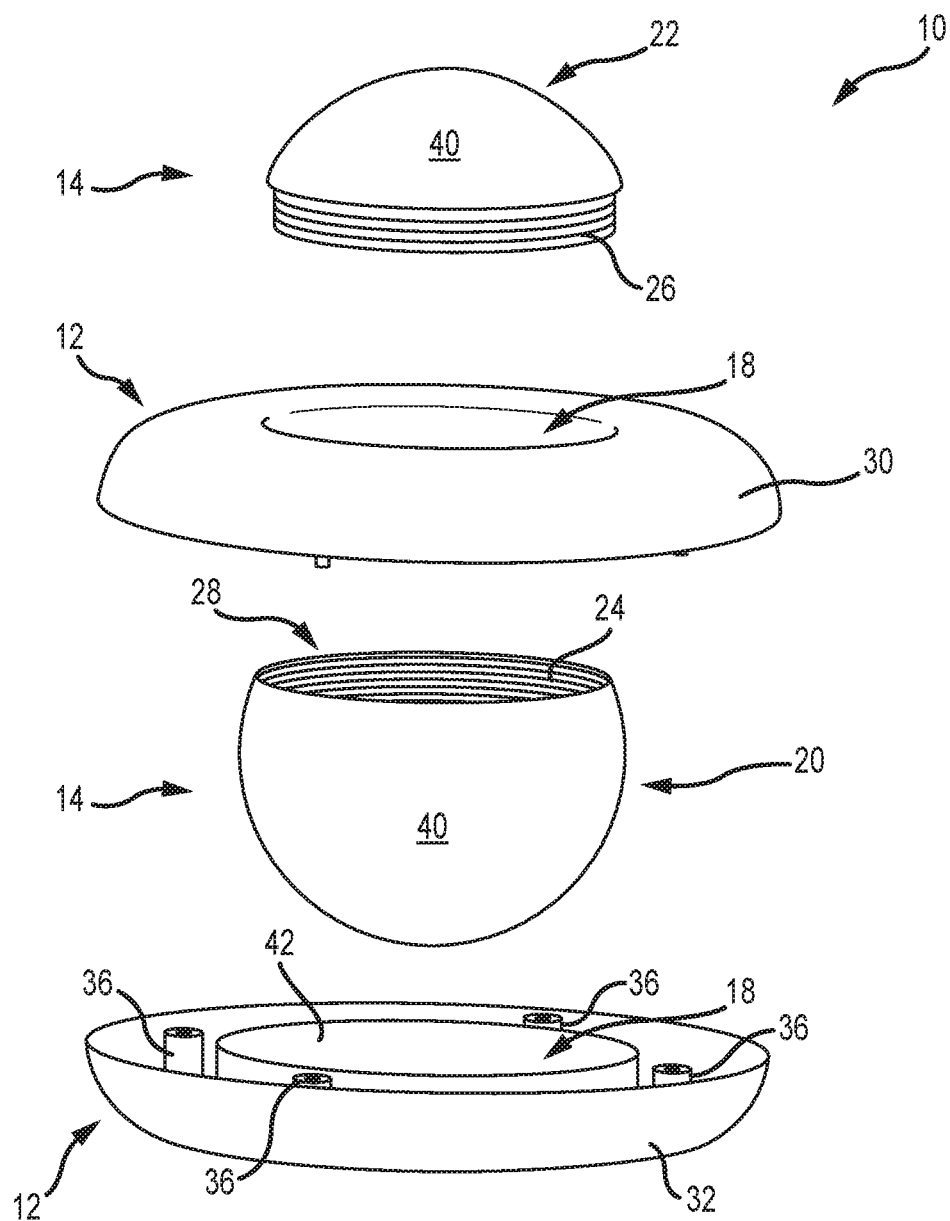
FIG. 4 is an exploded front perspective view of the invention.
Figure 4A:
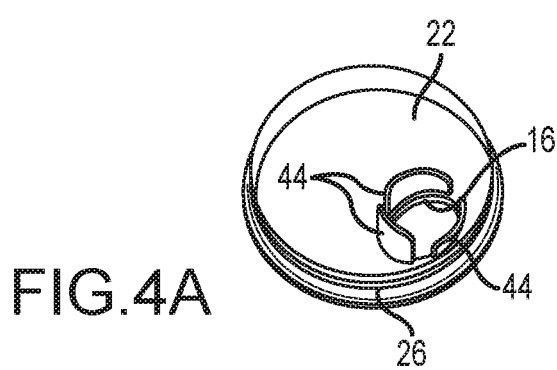
FIG. 4A is a perspective view of a treat dispensing lid of the invention.

Referring also to FIGS. 4 and 4A, additional structural details of the pet toy 10 are illustrated. As shown, the dispenser 14 may be constructed of two pieces or parts, namely, a base 20 and a cap or lid 22. The lid 22 may attached to the base 20 as by a threaded connection. Accordingly, FIG. 4 also illustrates such a threaded connection in which the lid 22 has exterior threads 26 that engage with interior threads 24 of the base 20. It will be appreciated that the base 20 and lid 22 may be selectively interconnected in different manners. For example, in one embodiment the lid 22 has interior threads and the base 20 has exterior threads. In another embodiment, the base 20 and lid 22 may include an interlocking tongue and groove. The treat holding chamber 28 is defined as the interior space within the dispenser 14. Optionally, in one embodiment, the base 20 and lid 22 may be sealed together.

The peripheral body 12 is also illustrated as being constructed of two sections or halves, an upper section 30 and a lower section 32. The upper and lower sections 30, 32 are attached to one another by opposing connectors, namely, male connectors 34 and female connectors 36.

Referring to FIG. 4A, a reverse perspective view of the lid 22 is illustrated showing a portion of the chamber 28 of the dispenser 14. An interior surface of the lid 22 may include projections 44 that can control the rate of dispense of treats through the dispensing opening 16. For example, relatively shorter projections 44 will provide less obstruction for treats passing through the dispensing opening 16, while relatively longer projections provide more obstruction for treats passing through the dispensing opening 16. The particular size, shape, and length of the projections 44 can be selected to optimize a particular dispense rate. Optionally, the projections 44 may be removably interconnected to the dispenser 14. Accordingly, the projections 44 can be rearranged, or removed from, the dispenser 14.

The projections 44 also serve as a safety feature reducing the risk of an animal paw pad becoming lodged/trapped in the dispensing opening 16. Without the projections, a paw pad could compress and slip into the dispensing opening. For example, if an animal places its paw through the opening, the paw may re-expand and become trapped. With use of the projections, the ability of the paw pad to re-expand after entering the dispensing hole is greatly reduced or eliminated since the projections increase the effective depth of the opening and keeps the paw pad compressed, thereby allowing the pad to slide back out of the dispensing hole. In the event the animal does pass the paw pad completely through the dispensing opening 16 and beyond the projections 44, the gaps between the projections allows the animal's individual pads on the paw to naturally compress or be drawn toward one another causing the paw pad as a whole to return to a smaller compressed size so it can be withdrawn back through the dispensing opening.

Another factor that determines dispense rate is the type of treats which are loaded within the chamber 28. Accordingly, a pet owner may choose a type of treat that can be dispensed at a desired rate considering the rotational or spinning movement of the dispenser 14 that is likely to occur when the pet owner's animal plays with the toy.

Figure 5:
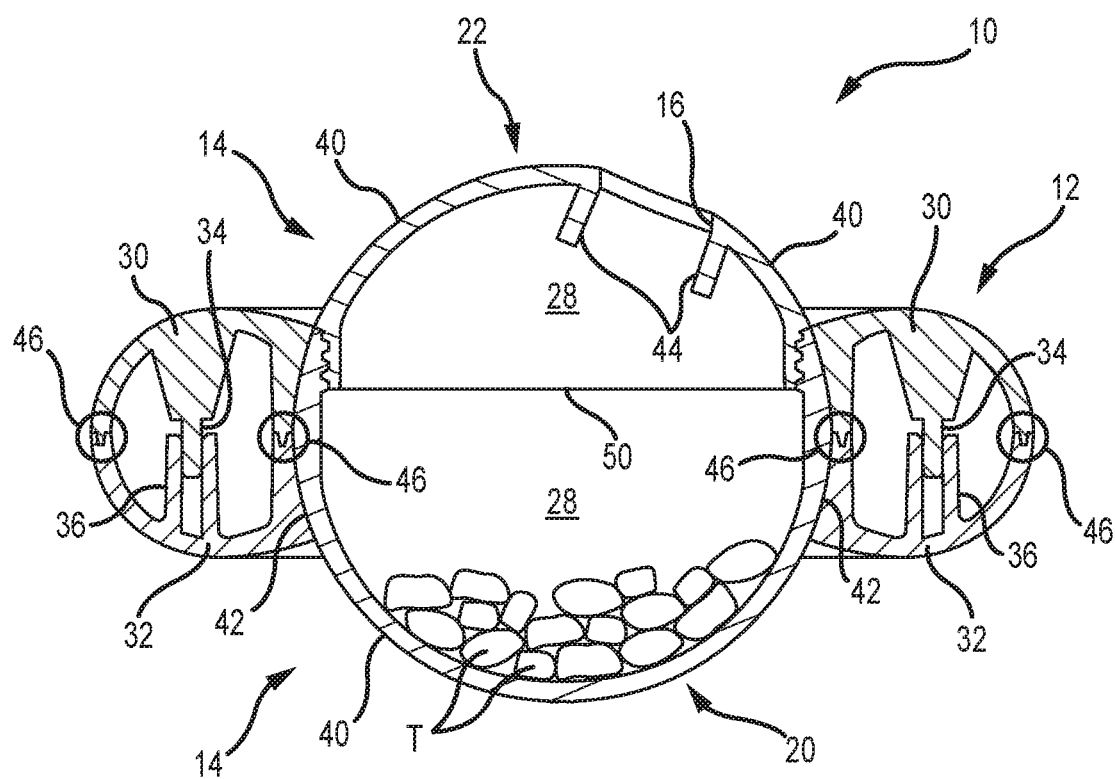
FIG. 5 is a cross sectional view of the invention.

Referring to FIG. 5, a cross-sectional view of the pet toy 10 is provided showing additional interior structural details of the toy. Male connectors 34 engage with female connectors 36 providing a structurally sound connection between the respective half sections 30, 32 of the peripheral body 12. Additionally, the interior peripheral edge 42 as well as the exterior peripheral edge of the half sections 30, 32 of the peripheral body 12 may be attached as by a tongue in groove connection 46 as shown to further provide structural stability in connecting the half sections 30, 32. The edges may be heat welded to one another, or may be secured as by an appropriate adhesive or epoxy. The relatively large interior chamber 28 of the dispenser 14 allows a pet owner to load or charge the toy with a substantial amount of treats T, or to otherwise selectively choose an amount of treats T to be loaded. As also shown in FIG. 5, the curved interior engaging surface 42 of the peripheral body 12 has an arcuate shape that substantially conforms to the shape of the spherical exterior surface 40 of the dispenser 14. Accordingly, the dispenser 14 rotates and changes orientation with respect to the peripheral body 12. Said another way, as the dispenser 14 rotates, the relative positions of the base 20 and lid 22 of the dispenser changes with respect to the interior engaging surface 42. In this manner, the dispensing opening 16 may become partially or fully obstructed by the interior engaging surface 42, altering the rate that treats T are dispensed from the chamber 28 of the toy 10. As an animal continues to play with the toy 10, the alignment of the dispensing opening 16 relative to the interior engaging surface 42 may continue to change, thereby alternately obstructing and exposing the dispensing opening 16.

The interior engaging surface 42 of the peripheral body 12 contacts a mid portion of the dispensing element 14. In one embodiment, a plane through a mid-point of the interior engaging surface 42 is substantially coplanar with a plane of a diameter of the dispensing element 14. The peripheral body 12 has a height that is perpendicular to a diameter forming major axis of the peripheral body. In one embodiment, the height of the peripheral body 12 is no greater than about half of the height (or diameter) of the dispensing element 14. Accordingly, a portion of the dispensing element 14 remains exposed and extends above an upper surface of the peripheral body 12 as the pet toy 10 is oriented in FIG. 5. Similarly, another portion of the dispensing element 14 remains exposed and extends below a lower surface of the peripheral body 12. In one embodiment, about one-fourth of the dispensing element 14 is exposed above the peripheral body 12 and another one-fourth of the dispensing element 14 is exposed below the peripheral body 12.

Because of the cross sectional size of the curved interior engaging surface 42, when viewed from the cross section of FIG. 5, the dispensing element 14 will remain engaged with the peripheral body 12. When the base 20 and lid 22 of the dispensing element 14 are interconnected, the dispensing element 14 cannot be separated from the peripheral body 12. This is because the interior engaging surface 42 extends along an arcuate length of the exterior surface 40 of the dispensing element 14. However, the dispensing element 14 can roll or spin with respect to the peripheral body 12 without undue force having to be applied to the peripheral body 12 since there is a slight gap or space between the peripheral body 12 and dispenser 14. In one embodiment, not illustrated, friction reducing elements may be positioned in the curved interior engaging surface 42. For example, in one embodiment, rollers or bearings are arranged in a variety of locations of the engaging surface 42 to contact the dispenser exterior surface 40.

FIG. 5 also illustrates an embodiment in which the dispenser base 20 is larger than the dispenser lid 22. Said another way, the dispenser base 20 is greater than a hemisphere and the dispenser lid 22 is less than a hemisphere. Accordingly, in one embodiment, when a joint 50 between the base 20 and the lid 22 is aligned substantially parallel to the joint between the upper 30 and lower 32 peripheral body sections, as illustrated in FIG. 5, the dispenser lid 22 may be separated from the peripheral body 12. In this manner, the peripheral body 12 may be opened to, for example, load the chamber 28 with treats T, clean the chamber 28 of the dispenser, or alter the arrangement of the lid projections 44 proximate to the dispensing opening 16.

Although the pet toy 10 is illustrated with only one dispensing opening 16 it will be appreciated that they pet toy 10 may have any number of dispensing openings 16. For example, in one embodiment, each of the dispenser base 20 and the dispenser lid 22 have a dispensing opening 16. In another embodiment, two dispensing openings 16 are included in the dispenser lid 22. In yet another embodiment, two dispensing openings are arranged in one of the dispenser base and the dispenser lid. In still another embodiment, the pet toy 10 has two or more openings arranged such that at least one of the openings is always unobstructed by the interior engaging surface 42 of the peripheral body 12.

According to a method of the invention, a substantially stationary element 12 peripherally surrounds an interior dispensing element 14. The dispensing element 14 includes a chamber 28. Animal treats T may be loaded into the chamber 28 through an opening 16. The dispensing element 14 is selectively rolled or rotated to dispense the treats T. The stationary element 14 provides a contact surface to enable a pet owner or animal to cause the dispensing element 14 to spin or rotate in order to dispense treats T through the opening 16. The speed of rotation and amount of rotation over a period of time can be modified to affect the rate and amount of treats T dispensed. An animal will likely learn that the greater amount of interaction by contact with the stationary element 12 results in a greater number of treats T that are dispensed. Similarly, the greater amount of force applied to the stationary element 12 will likely result in a faster spinning or rotational movement of the interior dispensing element 14 which may also result in a greater number of treats T being dispensed. If great enough force is applied, the toy 10 may be completely flipped over, but because the exterior surface 40 of the interior dispensing element 14 is spherical, the toy 10 can be flipped over and still remain functional in that contact with the stationary element 12 will still result in some degree of spinning or rotational movement of the dispensing element 14.

Considering the above features of the invention, in one aspect, it may be considered a pet toy 10 with selective and controlled capability to dispense treats T by spinning or rotational movement of a dispensing element 14 continually engaged with a peripheral body or ring 12. In connection with this aspect, the invention may be more particularly considered a pet toy 10 comprising: a peripheral body 12; an interior dispensing element 14 maintaining contact with said peripheral body 12, and an opening 16 formed in said interior dispensing element 14 communicating with a chamber 28 of said interior dispensing element. Projections 44 may be interconnected to an interior surface of the dispensing element and arranged proximate to the opening 16. The projections may be of different sizes and heights to one or more of: alter the rate of dispense of treats T from the chamber 28; and prevent the paws, or paw pads, of animals from being lodged and/or trapped in the opening 16 of the chamber 28.

In another aspect of the invention, considering the above described method, it may be considered a method of dispensing treats T from a pet toy 10 comprising: providing a substantially stationary element 12 peripherally surrounding an interior dispensing element 14; applying force to said stationary element 12 to selectively rotate said dispensing element 14 while the dispensing element maintains engagement with said stationary element 12; and dispensing treats T from a chamber 28 of said dispensing element 14 out of an opening 16 in said dispensing element 14 as said dispensing element rotates.

In yet another aspect of the invention, it may be considered a combination of a treat dispensing pet toy 10 with treats T loaded within the pet toy. According to this aspect, it may be more particularly considered in combination, a pet toy 10 and treats T to be dispensed from the pet toy comprising: a peripheral body 12; an interior dispensing element 14 maintaining contact with said peripheral body 12, and an opening 16 formed in said interior dispensing element 14 communicating with a chamber 28 of said interior dispensing element 14 for holding one or more treats T therein.

Although the invention has been described with specific reference to one or more preferred embodiments, it shall be understood that the invention may be modified or changed commensurate with the scope of the claims appended hereto.

What is claimed is:

1. A pet toy for dispensing treats, comprising:
a peripheral body having a ring shape and having a curved interior engaging surface;
an interior dispensing element having an opening formed through an exterior surface of said interior dispensing element and said opening communicating with a chamber of said interior dispensing element;
said exterior surface of said interior dispensing element is spherical, said peripheral body has the interior engaging surface that directly contacts said spherical exterior surface such that when said peripheral body is displaced, said interior dispensing element rotates and said spherical exterior surface maintains direct contact with said interior engaging surface;
wherein said interior dispensing element rotates by frictional contact against the ground while said peripheral body is maintained in a substantially fixed orientation with respect to the ground as said interior dispensing element rotates;
wherein said interior dispensing element does not fixedly rotate about any axis including not rotating about a major axis of said peripheral body;
wherein the curved interior engaging surface of the peripheral body has an arcuate shape that conforms to the shape of the spherical exterior surface of the interior dispensing element; and
wherein said peripheral body has a lower surface that remains spaced above the ground by said spherical exterior surface that maintains the direct contact with said interior engaging surface.

2. The pet toy, as claimed in claim 1, wherein:
said interior dispensing element is disposed within a central opening of said peripheral body.

3. The pet toy, as claimed in claim 1, wherein:
when said interior dispensing element rotates, a position of said opening changes with respect to said interior engaging surface.

4. The pet toy, as claimed in claim 1, wherein:
said interior dispensing element includes a lid that is threadably engaged with a base.

5. The pet toy, as claimed in claim 1, wherein:
said interior dispensing element includes a plurality of openings spaced from one another and formed through said interior dispensing element.

6. The pet toy, as claimed in claim 1, wherein:
said peripheral body has a height that is less than of a height of said interior dispensing element.

7. A pet toy for dispensing treats and treats in combination comprising:
a peripheral body;
an interior dispensing element in direct contact with said peripheral body;
one or more treats placed within said interior dispensing element;
an opening formed through a spherical exterior surface of said interior dispensing element and said opening communicating with a chamber of said interior dispensing element for holding said one or more treats therein;
wherein said peripheral body has a curved interior engaging surface that contacts said spherical exterior surface such that, when said peripheral body is displaced, said interior dispensing element rotates and said spherical exterior surface maintains direct contact with said curved interior engaging surface;
wherein the curved interior engaging surface of the peripheral body has an arcuate shape that conforms to a shape of the spherical exterior surface of the interior dispensing element;
wherein said interior dispensing element rotates by frictional contact against the ground while said peripheral body is maintained in a substantially fixed orientation with respect to the ground as said interior dispensing element rotates;
wherein said interior dispensing element does not fixedly rotate about any axis including not rotating about a major axis of said peripheral body; and
wherein said peripheral body has a lower surface that remains spaced above the ground by said spherical exterior surface that maintains the direct contact with said interior engaging surface.

8. The combination, as claimed in claim 7, wherein:
said peripheral body has a ring shape with a central opening; and
said dispensing element is disposed within said central opening of said peripheral body.

9. The combination, as claimed in claim 7, further including:
a plurality of projections extending from an interior surface of said dispensing element within said chamber and adjacent said opening, said projections having different lengths for selectively controlling a rate of treats dispensed through said opening.

10. The combination, as claimed in claim 7, wherein:
said interior dispensing element includes a lid that is threadably engaged with a base, wherein said base is larger than said lid such that said lid may be removed from said peripheral body.

11. The combination, as claimed in claim 7, wherein:
said peripheral body includes two half sections releasably connected to one another by a plurality of connectors.

12. The combination, as claimed in claim 7, wherein:
said interior dispensing element includes a plurality of openings spaced from one another and formed through said interior dispensing element.

13. The combination, as claimed in claim 7, wherein:
said peripheral body has a height that is less than of a height of said interior dispensing element.

14. A pet toy for dispensing treats such that treats are dispensed when the pet toy is moved upon the ground, said pet toy comprising:
a peripheral body having a ring shape and having a curved interior engaging surface;
an interior dispensing element having an opening formed through an exterior surface of said interior dispensing element, said interior dispensing element holding a quantity of treats to be dispensed;

said exterior surface of said interior dispensing element is spherical, said peripheral body has the interior engaging surface that directly contacts said spherical exterior surface such that when said peripheral body is displaced;

wherein said interior dispensing element rotates by frictional contact against the ground while said peripheral body is maintained in a substantially fixed orientation with respect to the ground as said interior dispensing element rotates; and wherein the curved interior engaging surface of the peripheral body has an arcuate shape that conforms to the shape of the spherical exterior surface of the interior dispensing element: and wherein said peripheral body has a lower surface that remains spaced above the ground by said spherical exterior surface that maintains the direct contact with said interior engaging surface.

15. The pet toy of claim 14, wherein:
said interior dispensing element does not fixedly rotate about any axis including not rotating about a major axis of said peripheral body.

16. The pet toy of claim 14, wherein:
said interior dispensing element freely rotates without an axle or any other supporting structure passing through said interior dispensing element.

17. The pet toy of claim 14, wherein:
a first portion of said interior dispensing element remains exposed and extends above an upper surface of said peripheral body.

18. The pet toy of claim 14, wherein:
a second portion of said interior dispensing element remains exposed and extends below a lower surface of said peripheral body.

19. The pet toy of claim 14, wherein:
the treats are dispensed when the pet toy is moved upon the ground by rotation of the interior dispensing element that holds the quantity of treats therein.

* * * * *